United States Patent [19]

Stern

[11] Patent Number: 4,858,172
[45] Date of Patent: Aug. 15, 1989

[54] SEALANT FLOW CONTROL FOR ROBOTIC APPLICATIONS

[75] Inventor: Howard Stern, Greenlawn, N.Y.

[73] Assignee: Robotic Vision Systems, Hauppauge, N.Y.

[21] Appl. No.: 105,559

[22] Filed: Oct. 5, 1987

[51] Int. Cl.[4] .................. G05B 13/02; B25J 11/00; G01F 25/00

[52] U.S. Cl. .................. 364/160; 417/18; 222/52; 901/43; 364/571.04; 364/510; 364/479

[58] Field of Search .............. 364/510, 180, 175, 160, 364/571.06, 571.04, 479, 509, 558; 222/55, 1, 52, 389; 118/698, 692, 688; 417/22, 20, 18; 901/43; 137/624.2

[56] References Cited

U.S. PATENT DOCUMENTS

| | | | |
|---|---|---|---|
| 3,904,078 | 9/1975 | Neff et al. | 222/1 |
| 4,352,636 | 10/1982 | Patterson et al. | 417/22 |
| 4,545,406 | 10/1985 | King | 137/553 |
| 4,552,513 | 11/1985 | Miller et al. | 417/18 |
| 4,613,059 | 9/1986 | Merkel | 222/52 |
| 4,667,852 | 5/1987 | Siemann | 222/54 |
| 4,678,100 | 7/1987 | Gelinas et al. | 222/52 |
| 4,682,166 | 7/1987 | Takeuchi et al. | 340/825.5 |
| 4,682,710 | 7/1987 | Turner, Jr. et al. | 222/63 |
| 4,709,858 | 12/1987 | Stern et al. | 239/296 |
| 4,720,801 | 1/1988 | Boll | 364/510 |
| 4,720,807 | 1/1988 | Ferran et al. | 364/558 |
| 4,745,541 | 5/1988 | Vaniglia et al. | 364/141 |

FOREIGN PATENT DOCUMENTS

| | | | |
|---|---|---|---|
| 0122086 | 10/1978 | Japan | 222/55 |
| 0110589 | 9/1981 | Japan | 417/22 |

Primary Examiner—Parshotam S. Lall
Assistant Examiner—S. A. Melnick
Attorney, Agent, or Firm—Max Fogiel

[57] ABSTRACT

A pressure profile versus flow rate is determined for a flow control system using positive displacement or a flow meter to measure flow. The profile is used as a pressure reference for closed loop pressure control of flow during the transient period following a change in commanded flow rate to reduce the time required to reach the new flow rate with compressible fluids and compliant output lines. Alternatively the pressure profile is automatically determined and updated continuously to adapt to environmental conditions affecting the accuracy of pressure controlled fluid flow.

10 Claims, 3 Drawing Sheets

SEALANT FLOW CONTROL FOR ROBOTIC APPLICATIONS

BACKGROUND OF THE INVENTION

Flow control is an integral part of robotic sealant applications. For a typical robotic sealant application, the robot velocity signal is used to control the flow rate of a sealant dispensing pump which is driven by a DC servo motor. Heretofore, a positive displacement pump has been used to control sealant flow since average sealant flow is then governed essentially by the piston area and the linear velocity of the piston. Because of the compressibility of most sealant materials and elasticity of sealant hoses, the flow rate always lags behind the velocity command of the piston. Also, factors such as temperature and nozzle wear affect the lag. Therefore, an inconsistent sealant bead occurs. An alternative control, such as exclusively using pressure control of sealant flow, is unreliable because of the many uncontrolled variables as, for example, temperature change, nozzle wear, viscosity changes, etc.

Even placing a flowmeter very near the output nozzle and forming a closed loop flow control does not provide a satisfactory solution since the variability of the parameters within the loop affects the loop stability.

SUMMARY OF THE INVENTION

It is an object of the present invention to overcome the prior art disadvantages. In particular, it is the object of the present invention to provide a method for improving material flow control in automated processes.

In keeping with this object and with still others which will become apparent as the description proceeds, the important characteristics of the invention are: greater accuracy in maintaining a given material flow rate sooner after a change in rate is commanded, and in the presence of changes of normal process variables such as viscosity and orifice size.

The present invention comprises the steps of experimentally determining the flow rate and pressure of the material at several steady state conditions; recording this information to provide a reference for closed loop pressure control; applying this calibration information via a pressure feedback control loop during a specified transient period; and switching over to positive displacement or closed loop flow meter flow control following the transient period.

A second preferred embodiment of the present invention provides for continuous adaptation of the reference data used for the closed loop transient pressure control. The method's steps are the same as in the first method, and furthermore measuring the steady state pressure after switching to positive displacement or closed loop flow meter flow control; and correcting the recorded reference value of pressure measured for the given flow.

In the first method, improved performance is obtained during the transient time when a new flow rate is initiated. The empirically determined reference data allows correction for nominal material compressibility, feedline expansion, viscosity and orifice size. In the second method further improvement of the transient performance is obtained by updating the reference data continuously as conditions change. Since changes normally occur slowly, compared to the periodic application of the data, the fact that the newly acquired correction for a given flow rate is not applied until the next time that flow rate is again ordered, does not contribute a significant error.

The present invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

DESCRIPTION OF THE PREFERRED EMBODIMENT

Figure 1:
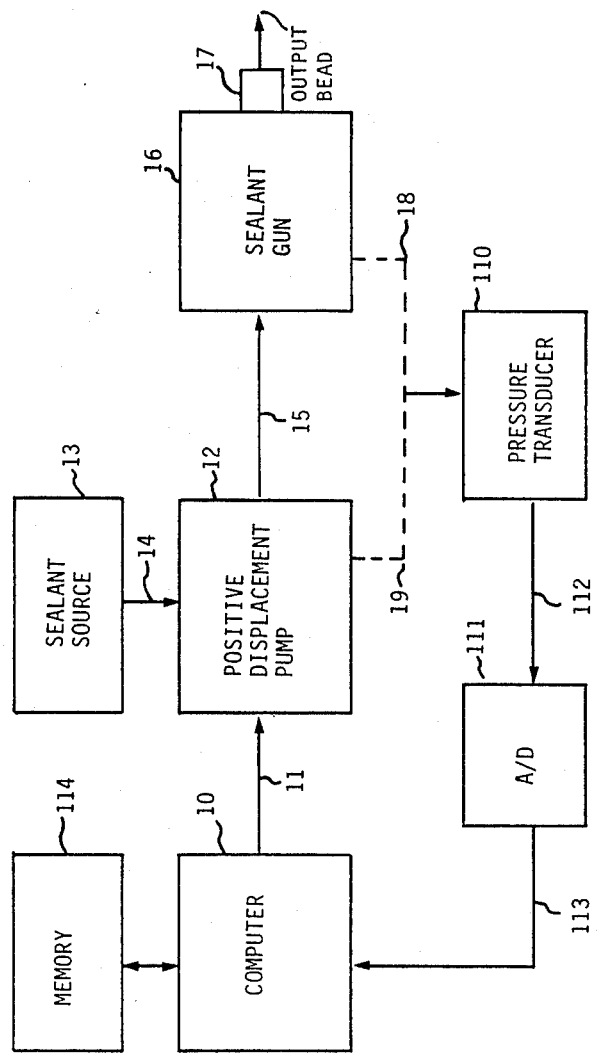
FIG. 1 is a block diagram showing the required components for acquiring empirical pressure versus velocity data and for providing closed loop pressure control.

FIG. 1 shows a block diagram of a digitally-controlled sealant dispensing system using displacement flow control with provision for closed loop pressure control. Flow is defined as $cm^3$ of material/sec and is equal to the cross-sectional area of a piston entering a cavity containing the material, times the velocity of the piston when the pressure in the cavity and its output line are constant. Computer 10 is programmed to send a sequence of velocity commands 11 to a positive displacement pump 12. Pump 12 draws in a volume of sealant from a source 13 such as a barrel (preferably pressurized) via an input line 14. Pump 12 then forces the sealant through output line 15 and gun 16 to form a bead on a surface via nozzle 17.

A closed loop flow control using feedback from a flow meter can be used in place of the positive displacement pump 12 to provide accurate steady state performance. To maintain stability, the loop bandwidth should be made as narrow as needed to avoid the adverse effects of the variable parameters within the loop that affect stability. Since performance will then be comparable to positive displacement flow control, the following descriptions are in terms of positive displacement flow control.

By sensing the pressure at either gun 16 via path 18, or pump 12 via path 19 with pressure transducer 110, computer 10 can record in memory 114 the pressure at steady state for various flow rates. Pressure transducer 110 ordinarily produces an analog output 112 that has to be converted by an analog to digital converter 111 to provide a digital input 113 proportional to pressure for computer 10. The sealant and the output line 15 are sufficiently compliant to cause the pressure to gradually build up to a steady state pressure and flow rate.

Computer 10 can be sufficiently fast to respond to the difference between the pressure sensed by transducer 110 and the steady state pressure recorded in memory 114, to modify the velocity command 11 for reaching the steady state pressure in a shorter period of time.

Figure 2:
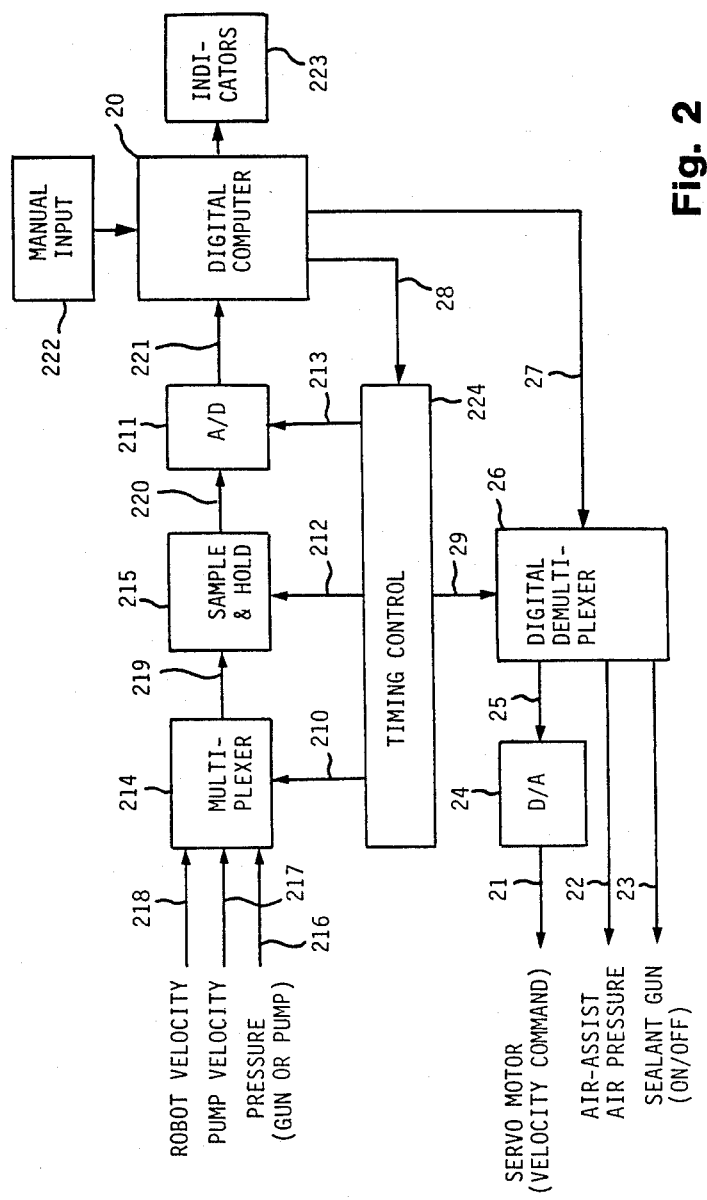
FIG. 2 is a system interfacing diagram for closed loop sealant control with pressure feedback.

FIG. 2 provides a block diagram of a preferred implementation of the flow control system. Manual inputs 222 to computer 20 instruct the computer to provide a given flow profile. Computer 20 provides indicators 223 for visual feedback to the operator about system status. Computer 20 sends timing instructions 28 to Timing Control 224 to synchronize all system real-time signals. Computer 20, moreover, sends commands 27 to demultiplexer 26 which receives synchronized timing commands 29 from Timing Control 224 to split commands 27 into three commands 25, 22, 23. Command 22 sets the air assist air pressure to properly shape the bead. Command 23 opens and closes the output orifice of the gun at the start and end of a bead, respectively. Command 25 is changed to an analog velocity control signal 21 via D/A Converter 24.

Positive displacement pump 12 receives signal 21 and drives a piston which displaces sealant in a cavity to generate the desired sealant flow rate out of gun 16. Analog signals 216, 217 and 218 are multiplexed by multiplexer 214 into signal input 219 leading to sample and hold circuit 215. Signal 216 is proportional to the sealant pressure. Signal 217 is proportional to the pump piston velocity. Signal 218 is proportional to robot velocity. Timing and Control circuitry 224 provides timing signals 210, 212 and 213 to multiplex, sample and convert the input signals to a digital input signal 221 for computer 20. A/D converter 211 converts analog signal 220 to digital signal 221.

Computer 20 makes the velocity command signal 21 proportional to the indicated robot velocity 218. Computer 20 also makes the air-assist pressure command 22 approximately proportional to robot velocity 218. Since sealant flow is proportional to piston velocity in the steady state case, the system provides flow proportional to robot velocity and a constant bead cross-section over a wide range of application velocities.

Figure 3:
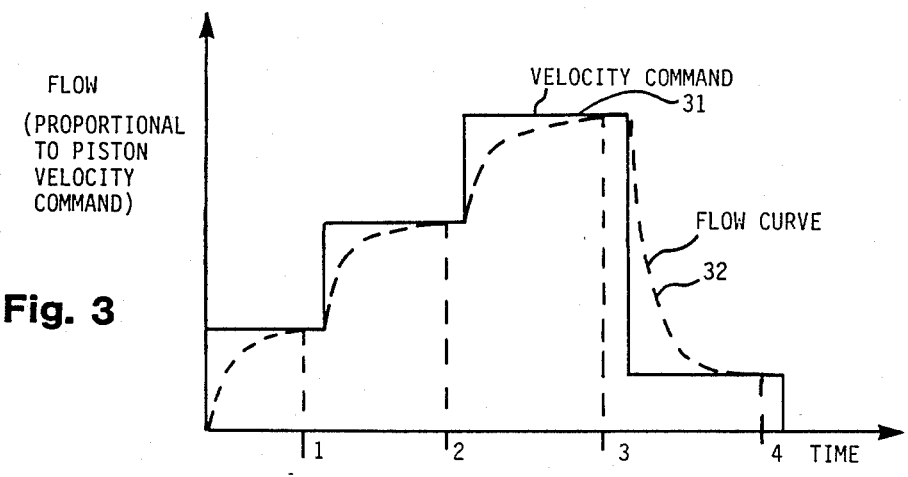
FIG. 3 illustrates the commanded piston velocity (flow rate) versus time profile and the flow actually occurring without pressure feedback control.

The present invention, in a first embodiment, uses the pressure 216 signal to create a calibration table of steady state pressure versus flow (commanded velocity). FIG. 3 shows how flow 32 asymptotically approaches the commanded piston velocity 31. The transient time is typically 1 second and is taken as the time to reach a given low value of pressure change per unit time. The improved system then uses a pressure feedback loop to reduce this transient response time, and obtain the desired bead cross-section sooner after each change in velocity.

Figure 4:
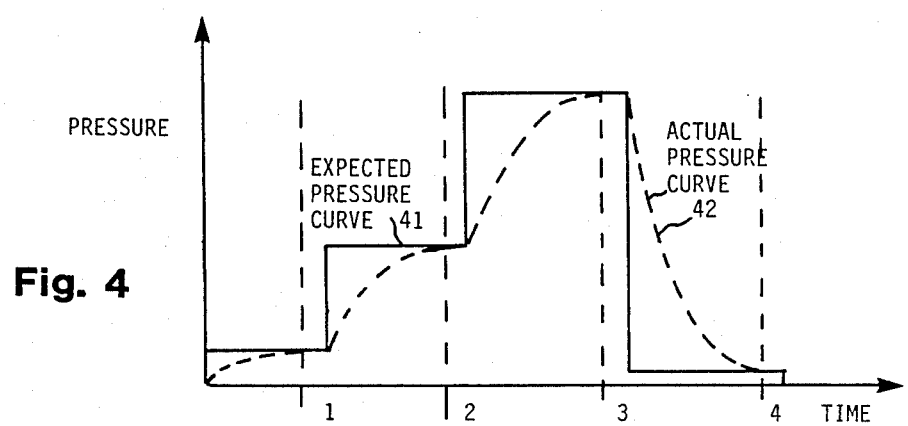
FIG. 4 illustrates the pressure versus time profile expected and actually occurring without pressure feedback control.
Figure 5:
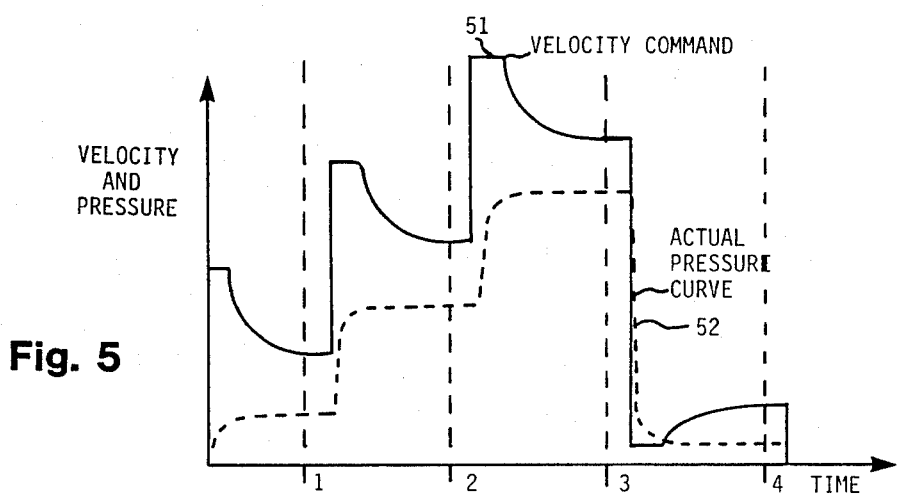
FIG. 5 illustrates the commanded piston velocity versus time and the pressure actually occurring with pressure feedback control.

FIG. 4 shows expected pressure curve 41 based on the steady state flow condition and the actual pressure curve 42 with no feedback compensation. By increasing the commanded velocity 21 until the measured pressure 216 nearly equals the steady state pressure value stored in the memory of computer 20 for the desired flow, and then reducing the commanded velocity 21 as shown by curve 51 to FIG. 5, to the steady state value, the transient time for the flow to reach steady state is greatly reduced. The actual pressure curve 52 shows the improved characteristic.

The prior art of using pressure feedback during the steady state produces inaccurate flow control, since the many variables that affect pressure are not accounted for. By switching over to positive displacement flow control after the transient period, high accuracy of flow is assured. The use of pressure feedback is only used during the transient period to shorten the time to reach steady state. The end of the transient period can be programmed into the computer as a fixed time interval or by sensing when the pressure is close to the expected steady state value.

In a second preferred embodiment, the calibration table of steady state pressure values versus steady state flow (piston velocity) is updated after each usage so that even greater precision during the transient period can be assured. The need for this proceeds from the fact that the orifice of nozzle 17 may wear and provide a larger opening with time, thus reducing sealant back pressure for a given flow rate. The viscosity of the sealant varies for different batches, and temperature also affects viscosity, which in turn varies the flow rate and the back pressure. Since these variables change from the time of calibration to the time of use, correction for these changes improves the system transient performance. As during calibration, the steady state pressure would be determined for updating after the end of the transient period.

The end of the transient period can be programmed into the computer as a fixed time interval or by sensing when the pressure is close to the steady state value expected. To reduce the effect of random measurement error, the last N measurements can be averaged to produce a more accurate reference value. Weighted averaging can be used by using appropriate scaling for each stored value. On start up, the calibration pressure can be stored in all N memory locations.

This pattern recognition approach is unique. It uses direct performance feedback (by monitoring process variation) to determine the action required. Also, its algorithm does not need a mathematical model of the process. As used with this "self-tuning" controller, it is an "expert system" approach incorporating the tuning rules normally used by a control engineer.

Although a digital embodiment has been described for the control portion of the flow control system, greater use of analog components can be anticipated within the concepts presented.

Initial values for the continuous updating flow control system can be theoretical or empirical values stored within the computer memory. Thus the system requires no calibration step, but adapts automatically to conditions differing from theoretical or experimentally-determined values.

The present invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method for reducing the transient pressure build-up time in a flow control system comprising the steps of:

calibrating a flow control system by: commanding a flow rate of a flow material; determining the rate of pressure change applied by said flow control system; waiting until the rate of pressure change falls below a preset value; recording the amount of time of said waiting, said time defining a transient period; measuring pressure applied to said flow material; recording flow rate and pressure; and repeating said calibrating step for all flow rates of interest;

using the calibration recordings to apply pressure loop flow control during said transient period by: selecting a flow rate; determining corresponding steady state pressure from said calibration recordings, said steady state pressure defining a reference pressure; determining difference between current pressure and said reference pressure, said difference defining an error signal; commanding a flow rate proportional to said error signal; and repeating the steps of determining said error signal and flow rate commanding until said error signal becomes less than a predetermined value;

and switching to positive displacement flow control at the end of said transient period, said displacement flow control maintaining a predetermined constant velocity of a piston of predetermined cross sectional area within a confining chamber causing said flow.

2. A method as defined in claim 1, wherein said calibration recordings are updated after each time a flow rate is selected by the steps of: measuring pressure applied to said flow material during said positive displacement flow control following said transient period; determining the rate of change of said pressure applied by said flow control; determining the rate of pressure change falling below a preset value; and recording pressure in place of the corresponding prior value of said recording.

3. A method as defined in claim 1, wherein flow is produced by positive displacement of flow material.

4. A method as defined in claim 2, wherein flow is produced by positive displacement of flow material.

5. A method as defined in claim 2, wherein said recording step comprises: recording pressure in place of an (N+1)th prior value of said recording; averaging N recorded pressure values; and using said average as said reference pressure.

6. A method as defined in claim 5, wherein said averaging is weighted.

7. A method as defined in claim 1, wherein said commanded flow rate during said transient period is non-linearly proportional to said error signal.

8. A method as defined in claim 1, wherein said transient period is limited to a value determined during said calibrating step.

9. A method for reducing the pressure transient time in a closed loop flow meter flow control system comprising the steps of:

calibrating a closed loop flow meter flow control system by: commanding a flow rate of a flow material; determining the rate of pressure change applied by said flow control system; waiting until the rate of pressure change falls below a preset value; recording the amount of time of said waiting, said time defining a transient period; measuring pressure applied to said flow material; recording flow rate and pressure; and repeating said calibrating step for all flow rates of interest;

using the calibration recordings to apply pressure loop flow control during said transient period by: selecting a flow rate; determining a corresponding steady state pressure from said calibration recordings, said steady state pressure defining a reference pressure; determining difference between current pressure and said reference pressure, said difference defining an error signal; commanding a flow rate proportional to said error signal; and repeating the steps of determining said error signal and flow rate commanding until said error signal becomes less than a predetermined value;

and switching to a closed loop flow meter flow control at the end of said transient period.

10. A method as defined in claim 9, wherein said calibration recordings are updated after each time a flow rate is selected by the steps of: measuring pressure applied to said flow material during said closed loop flow meter flow control following said transient period; determining the rate of change of said pressure applied by said flow control; determining the rate of pressure change falling below a preset value; and recording pressure in place of the corresponding prior value of said recording.

* * * * *